No. 773,373. PATENTED OCT. 25, 1904.
D. M. CARR.
LACING HOOK.
APPLICATION FILED DEC. 9, 1901.
NO MODEL.
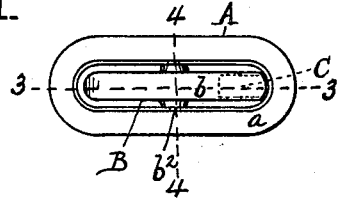
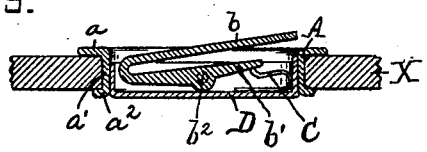
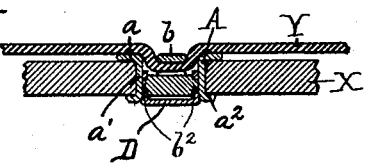
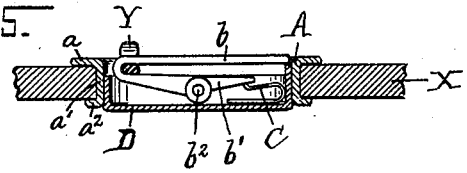
WITNESSES=
F. Bissell,
C. M. Perkins.
INVENTOR=
David M. Carr No. 773,373.  
Patented October 25, 1904.

UNITED STATES PATENT OFFICE.

DAVID M. CARR, OF ROCHESTER, NEW YORK.

LACING-HOOK.

SPECIFICATION forming part of Letters Patent No. 773,373, dated October 25, 1904.

Application filed December 9, 1901. Serial No. 85,118. (No model.)

*To all whom it may concern:*

Be it known that I, DAVID M. CARR, a citizen of the United States, and a resident of Rochester, in the county of Monroe and State of New York, have invented certain new and useful Improvements in Lacing-Hooks, of which the following is a specification.

This invention relates to lacing-hooks; and it consists in the mechanism hereinafter described and claimed.

The object of the invention is to provide a lacing-hook for use on shoes and under like circumstances whereby the shoe-lace is firmly held either by a series of such lacing-hooks or the end of the lace may be held by a single lacing-hook.

The device is intended particularly for use upon shoes; but it is obviously adapted for use in other devices where laces are employed.

In the drawings, Figure 1 is a top plan view of a lacing-hook embodying this invention. Fig. 2 is a side elevation of a lacing-hook embodying this invention adapted for being fastened to a shoe or other article to which it is intended to be attached. Fig. 3 is a longitudinal section on the line 3 3 of Fig. 1, showing also the device attached to a shoe-upper or other article and showing the device in one position. Fig. 4 is a cross-section on the line 4 4 of Fig. 1, showing also a device attached as in Fig. 3 with the lace in operative position; and Fig. 5 is a longitudinal section on the line 3 3 of Fig. 1, showing the hook in another position.

The outer casing A is provided for the operating mechanism, which may, as shown in the drawings, be an eyelet of suitable size and proportions, so that it may be attached by the usual eyeletting method to a sheet X of suitable material, such as the leather of the shoe-upper, as shown in Figs. 3, 4, and 5, whereby the horizontal flange $a$ of the eyelet lies upon the top of the surface of the sheet of material to which the device is attached, and its vertical flange $a'$ has its lower edge $a^2$ bent outwardly so as to engage the under side of the material and firmly to attach the eyelet thereto in the usual manner.

Inside the casing A is a hook B, transversely pivoted in said casing and adapted to be tilted so that the point of the hook projects outward from the casing, as shown in Fig. 3, or into the other position shown in Fig. 5, wherein the hook is wholly below the upper surface of the casing. Preferably the hook is pivoted by its lower arm $b'$ by means of the transverse pivot $b^2$, the form of which is shown in Fig. 4, its pivotal points projecting laterally from the sides of the lower member $b'$ of the hook into suitable cavities in the casing. The pivotal point of the hook is, as shown, preferably placed near the middle of the lower member $b'$ and opposite or substantially opposite the middle portion of the upper member $b$, so that when the lace Y is passed through the open mouth of the hook and into the back thereof the tendency of the lace is to lift the rear end of the hook and to depress the point thereof within the casing, as shown in Fig. 5.

A spring C is placed in the casing and acts upon the hook so as to lift it into the position shown in Fig. 3, wherein the point of the hook projects outside of the casing.

While the hook may be pivoted in the casing A in any suitable manner, a convenient and the preferable form of manufacturing my device is to provide a cup-shaped bottom piece D for the casing in which the hook is pivoted and which is adapted to fit tightly within said casing A, being inserted thereinto from the lower side thereof, and thus forming a closed surface or bottom for the casing A and being also a convenient and particularly practicable mode of manufacturing the device.

The operation of the device is as follows: The hook being tilted by the spring C so that the point of the upper member $b$ of the hook projects from the casing, a lacing is easily laid under the projecting point of the hook and being pulled backward until it passes to the left in Figs. 1 and 5 of the pivotal point lifts the back end of the hook. The lacing by this operation is bent downward, as shown in Fig. 4, into a sharp curve under the hook and is held in this position by the clamping action of the hook upon the lacing against the upper portion of the casing A. When in this position, the lacing cannot be pulled laterally from the hook, as will be seen from an examination of Fig. 4, and a stop is provided, such as the upper edge of the bottom piece D, (see Fig. 5,) to prevent the back end of the hook being lifted outside of or above the upper surface of the casing, thus locking the lacing firmly against release until the lacing is pulled out through the open mouth of the hook. After the lace passes the pivot its contact with and pull upon the upper member tilt the hook so as to close it, and the presence of the lace, even if loose, in the rear end of the hook prevents the opposite tilting thereof. There is no strain caused by the lacing-hook upon the lace tending to loosen the lace nor to strain and loosen the knot.

This device forms an efficient clamp for a lacing, which is low down and close to the surface of the sheet of material to which it may be attached, so as to avoid a projection or cause wear of any garment which may be rubbed against it and to avoid catching of the point of the hook by anything with which it may come in contact. The device is easily applied to a shoe or other article by the eyeletting process described above.

The device may be used either larger or smaller than the proportions shown in the drawings, in accordance to the particular use to which it may be applied.

What I claim is—

1. In a lacing-hook, the combination of a casing adapted for attachment to a sheet of material, and a tilting hook in said casing having a transverse pivot in said casing, the point of the hook being on one side of the pivot and the bend thereof being on the opposite side of the pivot, the said pivot being so placed that the lace passes said pivot and by contact with the upper member of the hook tilts the point of the hook downward, substantially as described.

2. In a lacing-hook, the combination of a casing adapted for attachment to a sheet of material, a tilting hook in said casing having a transverse pivot in said casing, the point of the hook being on one side of the pivot and the bend thereof being on the opposite side of the pivot, the said pivot being so placed that the lace passes said pivot and by contact with the upper member of the hook tilts the point of the hook downward, and a spring tending to tilt the point of the hook upward, substantially as described.

3. In a lacing-hook, the combination of a casing adapted for attachment to a sheet of material, a tilting hook in said casing having a transverse pivot in said casing, the point of the hook being on one side of the pivot and the bend thereof being on the opposite side of the pivot, the said pivot being so placed that the lace passes said pivot and tilts by contact with the upper member of the hook the point of the hook, and a stop to limit the tilting of the hook, substantially as described.

4. In a lacing-hook, the combination of a casing adapted for attachment to a sheet of material, a tilting hook in said casing having a transverse pivot in said casing, the point of the hook being on one side of the pivot and the bend thereof being on the opposite side of the pivot, the said pivot being so placed that the lace passes said pivot and by contact with the upper member of the hook tilts the point of the hook, a spring tending to tilt the point of the hook upward, and a stop to limit the tilting of the hook, substantially as described.

5. In a lacing-hook, the combination of a casing adapted for attachment to a sheet of material, a tilting hook in said casing having an upper member and a lower member, and a transverse pivot connecting the said lower member with said casing, the point of the hook being on one side of the pivot and the bend thereof being on the opposite side of the pivot whereby the lace passes the pivot and by contact with the upper member of the hook tilts the point of the hook downward, substantially as described.

6. In a lacing-hook, the combination of a casing adapted for attachment to a sheet of material, a tilting hook in said casing having an upper member and a lower member, a transverse pivot connecting said lower member with said casing, the point of the hook being on one side of the pivot and the bend thereof being on the opposite side of the pivot whereby the lace passes the pivot and by contact with the upper member of the hook tilts the point of the hook downward and a spring tending to tilt the point of the hook upward, substantially as described.

7. In a lacing-hook, the combination of a casing adapted for attachment to a sheet of material, a tilting hook in said casing having an upper member and a lower member, a transverse pivot connecting said lower member with said casing, the point of the hook being on one side of the pivot and the bend thereof being on the opposite side of the pivot whereby the lace passes the pivot and tilts the point of the hook downward, and a stop to limit the tilting of the hook, substantially as described.

8. In a lacing-hook, the combination of a casing adapted for attachment to a sheet of material, a tilting hook in said casing having an upper member and a lower member, a transverse pivot connecting said lower member with said casing, the point of the hook being on one side of the pivot and the bend thereof being on the opposite side of the pivot whereby the lace passes the pivot and tilts the point of the hook downward, a spring tending to tilt the point of the hook upward, and a stop to limit the tilting of the hook, substantially as described.

9. In a lacing-hook, the combination of a casing adapted for attachment to a sheet of material, a tilting hook in said casing having an open mouth at one end and a closed curve at the other, a pivot for said hook for connection with said casing opposite to the middle portion of the upper arm of said hook, said hook being adapted to lie in one position wholly within the casing and in another position to lie with its point projecting outward from the same, substantially as described.

10. In a lacing-hook the combination of a casing adapted for attachment to a sheet of material and having a separate bottom piece therein, a tilting hook in said casing transversely pivoted in said bottom piece and having a form whereby it is adapted in one position to lie wholly within the casing and in another position to lie with the point of the hook projecting above the same, substantially as described.

11. In a lacing-hook the combination of a casing adapted for attachment to a sheet of material, and having a separate bottom piece therein, a tilting hook in said casing transversely pivoted in said bottom piece and having a form whereby it is adapted in one position to lie wholly within the casing and in another position to lie with the point of the hook projecting above the same, and a spring tending normally to project the point of the hook outside the casing, substantially as described.

12. In a lacing-hook, the combination of the casing A, adapted for attachment to a sheet of suitable material, the bottom piece D in said casing, the hook B in said casing transversely pivoted therein and having the upper arm $b$, and the lower arm $b'$, the pivot in said hook being situated substantially opposite the middle portion of the upper arm $b$, and the spring C acting upon the lower arm $b'$ of said hook, whereby the point of the upper arm $b$ is projected outside of the upper surface of the casing, substantially as described.

DAVID M. CARR.

Witnesses:
L. L. LEISHER,
C. M. PERKINS.